US005566227A

United States Patent [19]
DeVaney

[11] Patent Number: 5,566,227
[45] Date of Patent: *Oct. 15, 1996

[54] SYSTEM AND METHOD FOR CONNECTION OF CELLULAR BASE STATIONS TO A MOBILE SWITCHING CENTER USING DIAL UP TELEPHONE CIRCUITS

[75] Inventor: David B. DeVaney, Longwood, Fla.

[73] Assignee: Astronet, Lake Mary, Fla.

[ * ] Notice: The term of this patent shall not extend beyond the expiration date of Pat. No. 5,402,470.

[21] Appl. No.: 409,025

[22] Filed: Mar. 23, 1995

Related U.S. Application Data

[63] Continuation of Ser. No. 23,956, Feb. 26, 1993, Pat. No. 5,402,470.

[51] Int. Cl.$^6$ .............................. H04Q 7/22; H04Q 7/30
[52] U.S. Cl. .............................. 379/59; 455/33.1
[58] Field of Search .................................. 379/58, 59, 60, 379/61, 63; 455/33.1, 54.1, 54.2, 33.4, 33.2

[56] References Cited

U.S. PATENT DOCUMENTS

| | | | |
|---|---|---|---|
| 4,658,096 | 4/1987 | West, Jr. et al. | 379/59 |
| 4,677,656 | 6/1987 | Burke et al. | 379/63 |
| 4,698,839 | 10/1987 | DeVaney et al. | 379/60 |
| 4,712,229 | 12/1987 | Nakamura | 379/58 |
| 4,737,975 | 4/1988 | Shafer | 379/58 |
| 4,771,448 | 9/1988 | Koohgoli | 379/60 |
| 4,775,997 | 10/1988 | West, Jr. et al. | 379/58 |
| 4,860,337 | 8/1989 | Shimura | 379/63 |
| 4,870,696 | 9/1989 | Yorita | 379/59 |
| 4,887,265 | 12/1989 | Felix | 379/59 |
| 4,890,315 | 12/1989 | Bendixen et al. | 379/59 |
| 4,955,050 | 9/1990 | Yamauchi | 379/59 |
| 4,975,939 | 12/1990 | Sasaki | 379/60 |
| 5,036,531 | 7/1991 | Spear | 379/58 |
| 5,260,988 | 11/1993 | Schellinger et al. | 379/59 |
| 5,402,470 | 3/1995 | DeVaney | 379/58 X |

OTHER PUBLICATIONS

K. J. S. Chadha, C. F. Hunnicutt, S. R. PF.CK and J. Tebes, Jr., "*Mobile Telephone Switching Office*", American Telephone and Telegraph Company, The Bell System Technical Journal, vol. 58, No. 1, Jan. 1979, pp. 71–95.

Z. C. Fluhr and P. T. Porter, "*Control Architecure*", American Telephone Company, The Bell System Technical Journal, vol. 58, No. 1, Jan. 1979, pp. 43–69.

*Primary Examiner*—Curtis Kuntz
*Assistant Examiner*—Michael B. Chernoff
*Attorney, Agent, or Firm*—Leydig, Voit & Mayer, Ltd.

[57] ABSTRACT

A cellular or non cellular radiotelephone system consisting of a plurality of base station radios at one or more radio base station sites including method of connection of such base station radios to the Mobile Switching Center by the use of standard public telephone circuits whereby connections on these public telephone circuits are established only when required to provide communications to a mobile subscriber served by the radio base station.

25 Claims, 7 Drawing Sheets

SYSTEM AND METHOD FOR CONNECTION OF CELLULAR BASE STATIONS TO A MOBILE SWITCHING CENTER USING DIAL UP TELEPHONE CIRCUITS

This is a continuation of application Ser. No. 08/023,956, filed on Feb. 26, 1993, now U.S. Pat. No. 5,402,470.

FIELD OF THE INVENTION

The invention relates generally to the field of radio telephone systems, and in particular to a system and method for interconnecting such systems to the public telephone network.

BACKGROUND OF THE INVENTION

Cellular radio telephone systems now being deployed throughout the world generally consist of a mobile switching center (MSC) and a plurality of radio base stations (RBS), each RBS having a plurality of radio transceivers for servicing mobile units.

For every transceiver at the RBS there is typically a permanent and dedicated voice circuit between the RBS and the MSC. These circuits may be a facility leased from the local telephone company or other common carrier of wired communications, where the facility comprises dedicated lines. Alternatively, they may be privately owned communications facilities, which are also comprised of dedicated lines or dedicated microwave communications facilities. In any case, the circuits between the RBS and the MSC are permanent and dedicated regardless of the amount or frequency of use. Moreover, such an arrangement also requires the MSC to have a permanently dedicated port for each RBS transceiver in the cellular system.

The MSC also has a group of circuits over which calls to and from the local common carrier network are completed. This group of circuits is typically only large enough to handle the anticipated peak number of simultaneous calls and therefore there are fewer such circuits in the group than the sum of all transceivers in the system.

Since most systems consist of a plurality of RBSs, each with a plurality of transceivers, the number of transceivers in use at any point in time in comparison to the total number will vary from extremely low to moderately high. Averaged over an extended period of time, the percentage of usage for each of the MSC to RBS circuits is very low.

A typical cellular radio telephone system of the foregoing type is depicted in U.S. Pat. No. 4,698,839 which is herein incorporated by reference. These systems include a mobile switching center (MSC) connected to one or more radio base stations (RBS), each RBS containing a plurality of radio transceivers. The RBSs connect to the MSC through groups of dedicated telephone trunk circuits, which are provided by private facilities or leased from the common carrier network. In order for calls to be made between the cellular system and the common carrier network, the MSC further connects to the common carrier network by dedicated trunk circuits. The circuits between the MSC and the RBSs include both voice and data lines. The data lines are used to communicate control information between the MSC and the RBSs, and between the mobile phone and the MSC via the RBS. The voice lines are used to interconnect the voice circuit of the mobile telephone to the MSC, which switches the voice signals to the proper destination.

For a typical cellular radio telephone system, the following is an exemplary process flow of a call from a mobile telephone to a telephone in the common carrier network:

1. The mobile caller enters the telephone number that he or she wishes to be connected to, and directs that the call be made.
2. The mobile telephone sends an origination request to the RBS by way of a radio frequency (RF) signal.
3. The RBS decodes the RF signal as a control message and sends the message or its equivalent to the MSC over a data line.
4. The MSC determines the validity of the mobile phone (i.e., whether the mobile telephone is registered to a system subscriber) and the validity of the request.
5. If the mobile phone and request are recognized as valid, the MSC sends a message to the RBS to activate and appropriately tune a transceiver to provide service to the mobile telephone on a certain RF frequency and directs that a message be sent from the RBS to the mobile telephone, instructing it to use that certain RF frequency for the call. The MSC further assigns a dedicated voice line for the audio transmission between the MSC and the RBS.
6. The mobile telephone tunes its transceiver to the designated frequency and, if appropriate, enables its audio circuitry.
7. The mobile telephone now has a two-way audio path (over the RF carrier) to the RBS and over the dedicated voice circuit to the MSC.
8. The MSC selects a trunk line from the group connecting the MSC to the common carrier network and signals the number to be called (e.g., a landline subscriber) to the network.

With the call in progress, the MSC has control of the call and can modify the switched connection between the MSC and the RBS during the call. For example, the MSC can handoff the call to another RBS or support features such as three-way calling by the mobile telephone.

Although the prior art systems as identified by the foregoing example work well, they inefficiently use trunk circuits, especially those dedicated as voice circuits between the MSC and the RBS, thereby increasing the cost of operating the system. This is because dedicated voice circuits connect the MSC to the RBS at all times, despite the amount and frequency of their actual use.

Such inefficiency is especially costly in microcell applications. Microcells, well known in the art, are small RBS cells. A typical microcell application is to serve a small area, within a macrocell (i.e. a larger RBS cell), that has a high demand for mobile service for short or intermittent periods of time. Examples might include an office complex that has a high demand during business hours and a commuter station that has a high demand during rush hours on business days. Other examples such as golf courses, beaches and other entertainment areas have a high demand during non-business hours.

SUMMARY OF THE INVENTION

Accordingly, it is an object of the invention to provide a system and method for more efficiently utilizing the trunk circuits connecting the RBSs to the MSC in a cellular radio telephone system.

It is also an object of the invention to substantially reduce the number of dedicated trunk circuits connecting the RBSs and the MSC.

It is a further object of the invention to reduce the number of trunk circuits required for voice coupling between the MSC to the RBSs to an amount equal to the number of mobile telephones simultaneously in use.

It is yet another object of the invention to implement systems having a reduced number of dedicated lines in microcell applications.

Briefly, the invention provides an efficient system for connecting RBSs and the MSC using a common carrier telephone network and establishes that connection only when required. By utilizing the common carrier network, the invention eliminates the need to have dedicated trunk circuits between the RBSs and the MSC. Because in this system voice circuits are created either on demand or in anticipation of demand, the invention reduces the number of dedicated trunk circuits required between the MSC and the common carrier network to the number of mobile telephones in use.

The invention provides a cellular mobile telephone system that incorporates a switching office of a common carrier telephone system, the cellular mobile telephone system comprising a mobile switching center for connecting mobile telephones in the system to one another and to telephones outside the system by way of the switching office. A base station defining a cell of the system connects the mobile telephones to the mobile switching center, and a plurality of trunk lines connects the mobile switching center to the switching office. Means connecting the base station to the switching office in accordance with a protocol of the common carrier system are provided, along with means for connecting and disconnecting in a predetermined manner the base station and the mobile switching center by way of the switching office, thereby enabling a temporary voice circuit for at least one mobile telephone by establishing a completed communication path between the radio base station and the mobile switching center.

Other objects and advantages will become apparent from the following detailed description when taken in conjunction with the drawings, in which:

While the invention will be described in connection with a preferred embodiment, there is no intent to limit it to that embodiment. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
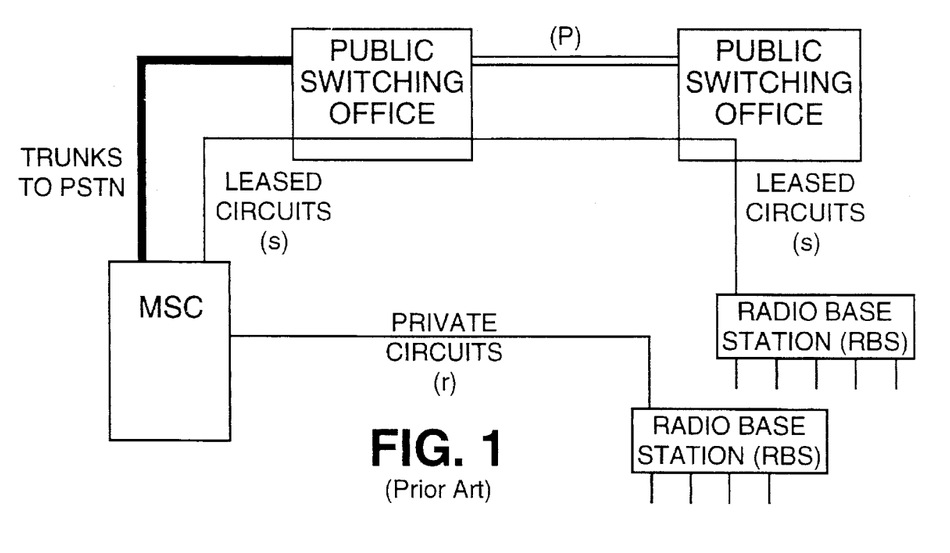
FIG. 1 illustrates a typical prior art network configuration of a cellular radio telephone system using dedicated lines between the RBSs and the MSC.
Figure 2:
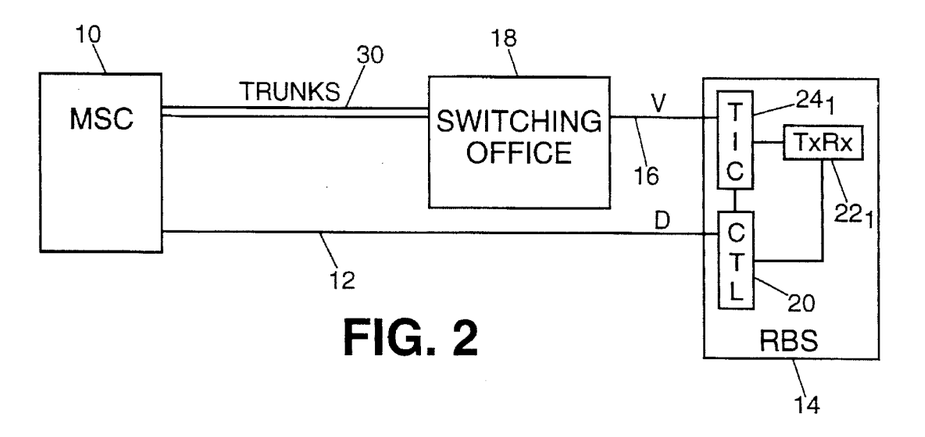
FIG. 2 is a functional block diagram of the cellular radio telephone system according to the invention.

Turning now to the drawings and referring first to FIG. 2, there is shown a functional block diagram of the invention. A mobile switching center (MSC) 10 is shown having at least one data line 12 to a single radio base station (RBS) 14. Although the data line 12 is shown as directly connecting the RBS 14 with the MSC 10, the data line 12 could alternatively make this connection through the switching office 18. The RBS 14 consists of a control unit (CTL) 20, at least one transceiver (TxRx) $22_1$, and at least one telephone interface circuit (TIC) $24_1$. The RBS 14 has one or more available voice lines 16 to a switching office 18 of the common carrier network.

Figure 3:
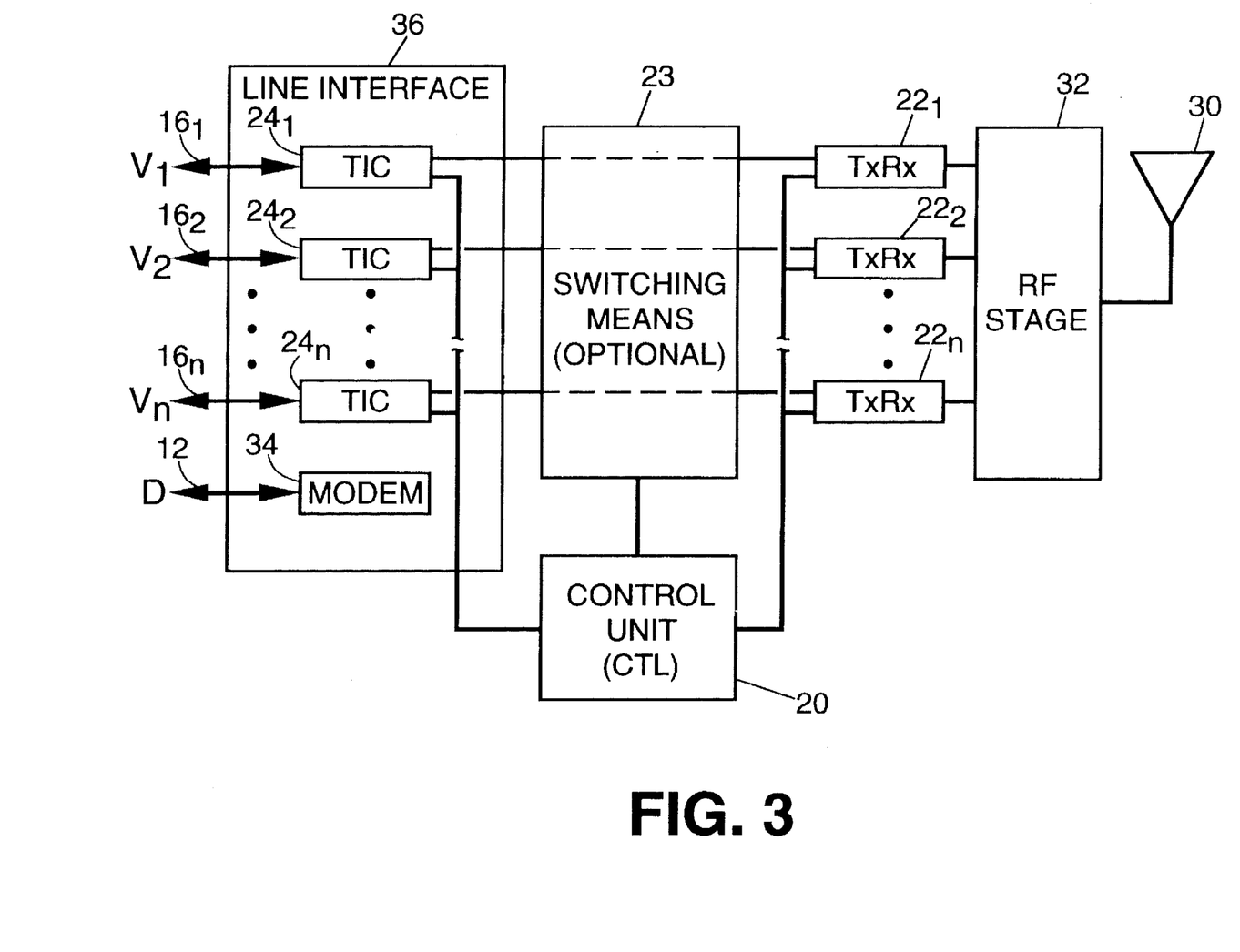
FIG. 3 is a detailed illustration of a typical radio base station according to the invention.

FIG. 3 shows a typical RBS of the present invention in more detail, including a plurality of TICs $24_1$–$24_n$ and TxRxs $22_1$–$22_n$. RF signals to and from a radio telephone (not shown) are transmitted and received at an antenna 30. An RF stage 32 connects the antenna to one or more transceivers $22_1$–$22_n$. The transceivers $22_1$–$22_n$ convert signals between electrical and radio frequency. The control unit (CTL) 20 activates and deactivates the transceivers $22_1$–$22_n$ in accordance with signals from the MSC, (such as the MSC 10 of FIG. 2). The CTL 20 communicates with the MSC 10 through a modem 34 over the data line 12.

In accordance with the present invention, the CTL 20 also controls the operation of the TICs $24_1$–$24_n$. The TICs $24_1$–$24_n$ interface the electrical signals of the TxRxs $22_1$–$22_n$ to the switching office 18 in accordance with a protocol specified by the common carrier network or its governing agency, e.g., the Federal Communications Commission in the United States. For example, the protocol might be Dial pulse (DP) or dual tone multifrequency (DTMF) signalling. Typically, the interface is an analog two-wire type that is common for standard telephone connections but could also be four-wire analog commonly used for trunks or an ISDN (Integrated Services Digital Network) interface.

Thus, the TICs $24_1$–$24_n$ associated with each TxRx $22_1$–$22_n$ of the RBS 14 are connected to the switching office 18 of the common carrier network by standard telephone lines $16_1$–$16_n$ used in the network. These lines may have individually assigned directory numbers. However, other address methods may also be used including line hunt group, CENTREX or other methods known to those skilled in the art. The TICs $24_1$–$24_n$ and the modem 34 comprise line interface 36.

Typically, one TIC corresponds to one TxRx, however it can readily be appreciated that by simply adding an optional switching means 23 between the TxRxs $22_1$–$22_n$ and the TICs $24_1$–$24_n$ under the control of the CTL 20, the various TxRxs can connect to the switching office 18 through any available TIC. For example, such a switched configuration allows the CTL 20 to connect a TxRx to a voice line wherein a connection has already been established (but not disconnected) from a previously completed call, regardless of which TxRx is designated by the MSC 10.

Figure 4:
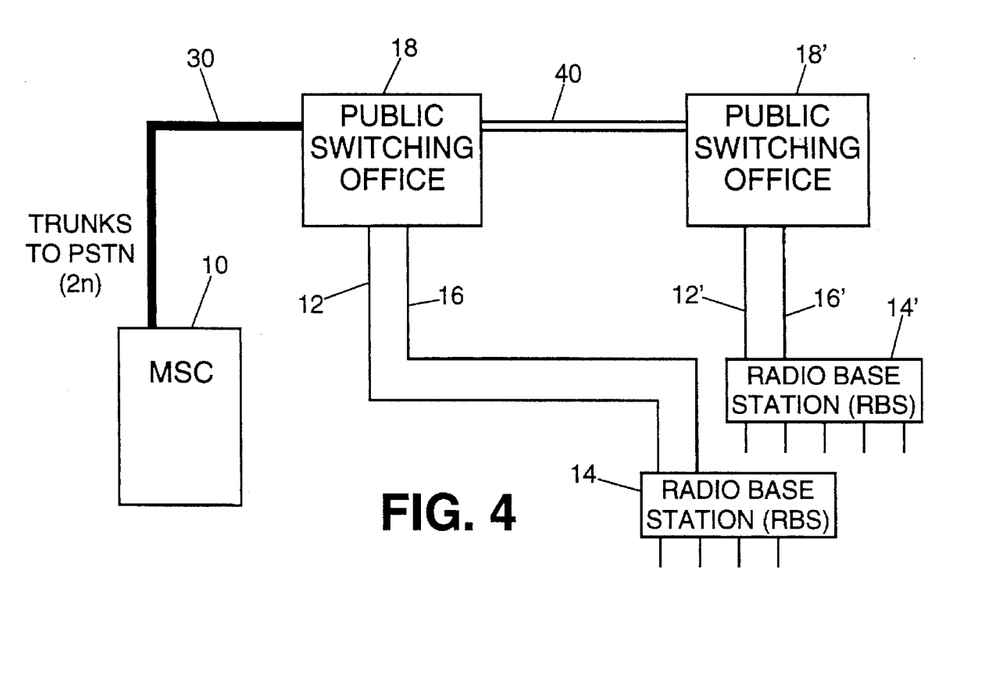
FIG. 4 illustrates a typical network configuration of a cellular telephone system according to the invention.

Referring to FIG. 4, in a network configuration the MSC 10 can connect to RBSs 14 and 14' through the switching offices 18 and 18' of the common carrier network. Although only two switching offices and two RBSs are shown, it can readily be appreciated that other configurations of public switching offices and RBSs are feasible. The switching offices 18 and 18' connect to each other via ordinary public telephone trunks 40.

In conventional systems, a block of telephone numbers is provided by the common carrier network to the MSC 10, the numbers then being individually assigned to mobile subscribers. A call from the common carrier network to one of the numbers in this block establishes a connection between the switching office 18 of the network and the MSC 10 through one of the trunk circuits 30. The MSC 10 then completes the call to the mobile subscriber via a suitable RBS, for example RBS 14. Calls made by a mobile subscriber to the common carrier network are connected essentially in the reverse order. During such calls, these trunk circuits 30 are used as both voice circuits to the RBS and voice circuits to the public network. Although the data lines 12 and 12' are shown as connecting the RBSs 14 and 14' to MSC 10 through the switching offices 18 and 18' in an alternate configuration one or more data lines 12 and 12' can be directly connected from the RBSs 14 and 14' to the MSC 10.

Figure 6:
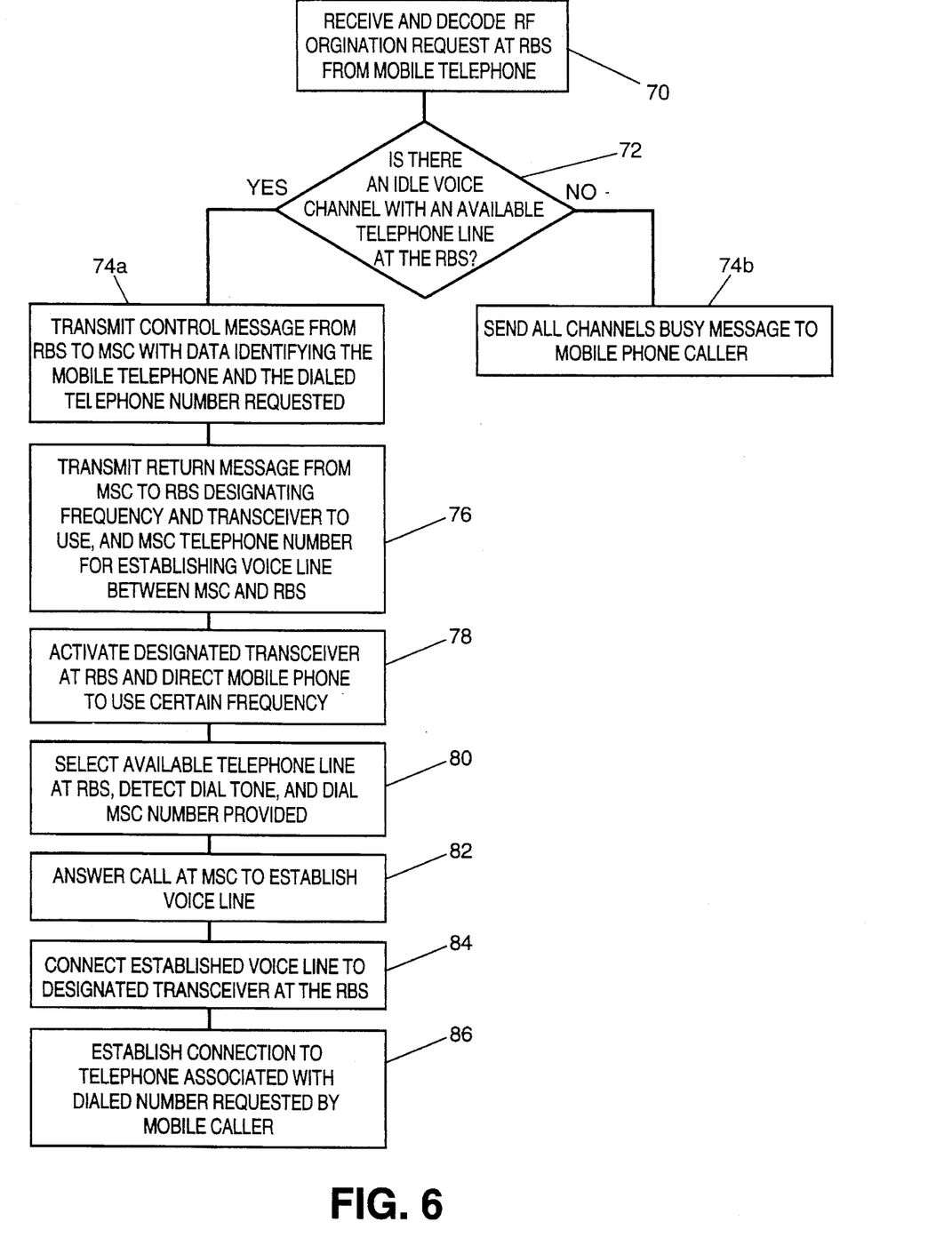
FIG. 6 is a flow diagram of system software functions for implementing the invention when a mobile telephone places a call to the common carrier network and the RBS calls the MSC to establish the voice circuit.

In accordance with the invention, additional telephone numbers (ideally from the same block of subscriber numbers) are assigned to the MSC 10 by the common carrier network, but reserved for calls from the RBSs (such as RBS 14 and RBS 14') to the MSC 10. Instead of having permanent and dedicated lines, the RBSs 14 and 14' connect to the MSC 10 by dialing these reserved numbers to establish voice circuits 16 and 16' through the public switching office 18' to the MSC 10. Referring to FIGS. 2–4 and the numbered steps of FIG. 6, in keeping with this inventive feature, once the mobile caller enters the telephone number that he or she wishes to be connected to and directs that the call be made, a typical process flow of a mobile call utilizing TxRx $22_1$ of RBS 14 is as follows:

Step 70. The mobile telephone (not shown) sends an origination request to the RBS 14 by way of an radio frequency (RF) signal.

Step 72. The RBS 14 typically checks for an idle voice channel (transceiver) and telephone line. As shown by step 74b, if no transceiver and line are idle, the RBS 14 sends a busy signal or its equivalent to the mobile caller.

Step 74a. If a voice channel and telephone line are idle, the RBS 14 decodes the RF signal as a control message, and sends the message or its equivalent to the MSC 10 over the data line 12. Data line 12 is typically a dedicated data line. The control message generally contains information identifying the mobile telephone and the telephone number that the mobile phone user has dialed, (for billing and validation purposes). Although not necessary to the invention and not shown, ordinarily the MSC 10 first determines the validity of the mobile phone (i.e., whether the mobile telephone is registered to a system subscriber) and the validity of the request (by means not shown) before any further steps are taken. Other information could also be transmitted, for example the strength of the signal being received from the mobile phone, which is useful for handoff purposes.

Step 76. Assuming the phone and request are valid, the MSC 10 returns a message through data line 12 to CTL 20 of RBS 14, directing CTL 20 to select one of its TxRxs $22_1$–$22_n$ (for example TxRx $22_1$) for providing service to the mobile telephone on a certain RF frequency and directing the RBS 14 to send a message to the mobile telephone instructing it to use that certain RF frequency for the call. In keeping with the invention, the message to the RBS also contains one of the telephone numbers reserved by the MSC 10 to which the RBS 14 is to place a call in order to establish a voice communications line (for example voice line $16_1$ of FIG. 3) between the RBS 14 and the MSC 10.

Step 78. The RBS 14 activates the designated transceiver, TxRx $22_1$, and directs the mobile telephone (not shown) to tune itself to the designated frequency. The mobile telephone tunes its own transceiver to the designated frequency and, if appropriate, connects its audio section to the TxRx $22_1$.

Step 80. The TIC $24_1$ of FIG. 3 associated with the selected TxRx $22_1$ at the RBS 14 seizes its associated line (such as voice line $16_1$) to the switching office 18 of the common carrier network, detects dial tone, and dials the appropriated MSC telephone number.

Step 82. The MSC answers the call, establishing the complete path over voice line $16_1$, through switching office 18 and over trunk circuit 30.

Step 84. Utilizing the TIC $24_1$, the RBS 14 then connects its end of the voice line $16_1$ to the TxRx $22_1$. The mobile telephone now has a two-way voice path to the RBS 14 and over the dialed voice line $16_1$ and trunk 30 to the MSC 10.

Step 86. The MSC 10 then establishes the connection to the telephone or its equivalent associated with the telephone number originally requested by the mobile caller. Thus, if the call is being placed to a telephone on the common carrier network, (i.e., not to another mobile phone) the MSC 10 selects an available trunk from the group of trunk circuits 30 connecting the MSC 10 to the switching office 18 of the network and signals the user-dialed number to the network. The MSC 10 then switches the incoming call from the RBS 14 on the incoming trunk circuit to the outgoing trunk selected from the group of trunk circuits 30. The mobile phone now is connected to the network. It can readily be appreciated that should the MSC be able to recognize the dialed number as belonging to another mobile telephone within its system, the MSC 10 could connect to the other mobile telephone directly through an appropriate RBS as described hereinbelow.

Figure 7:
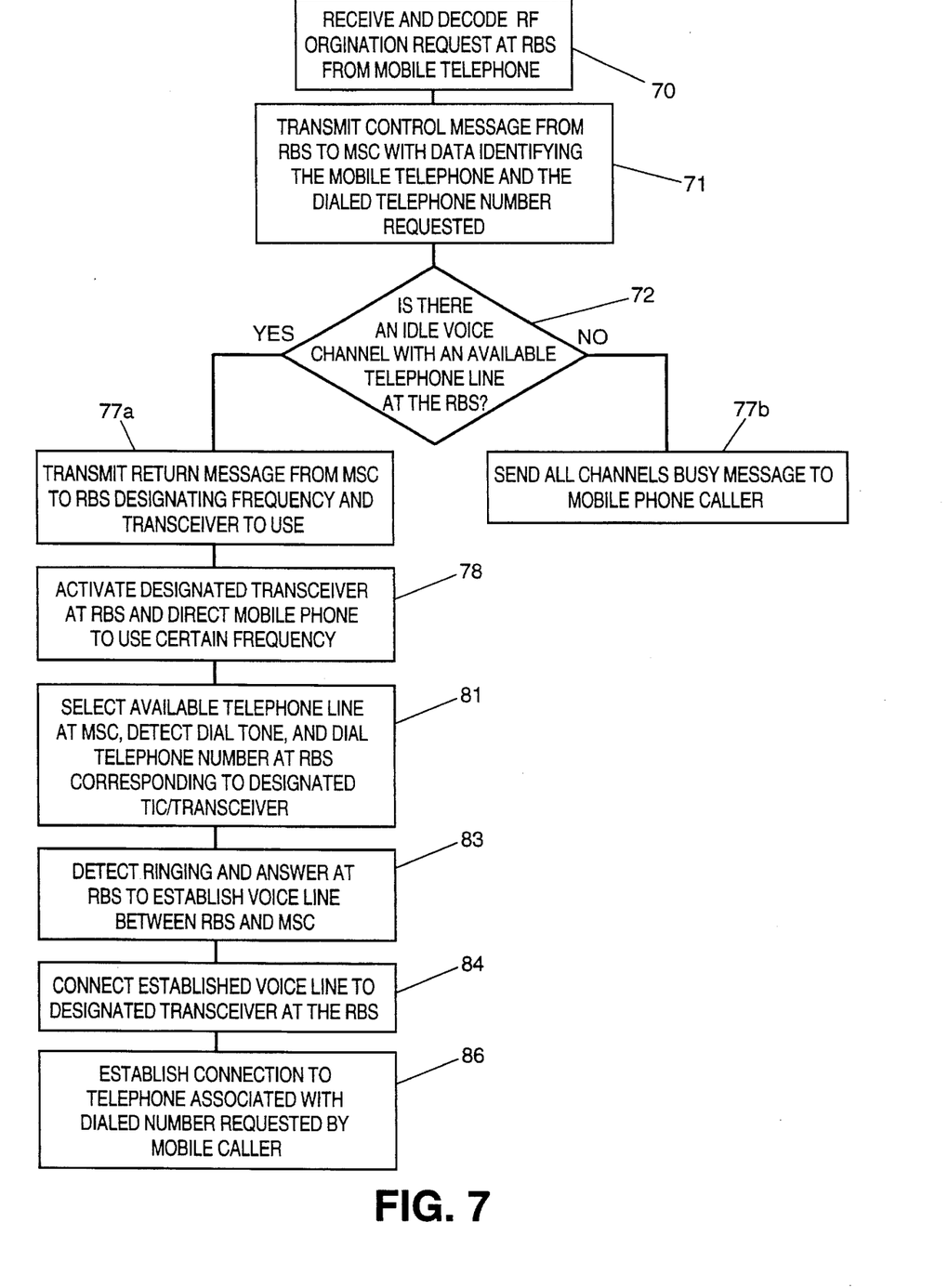
FIG. 7 is a flow diagram of system software functions for implementing the invention when a mobile telephone places a call to the common carrier network and the MSC calls the RBS to establish the voice circuit.

In an alternative procedure to that of steps 72–86, as shown in FIG. 7, the MSC 10 initiates the call that connects the MSC 10 to the RBS 14. Because the MSC 10 initiates the call, the MSC 10 chooses the TIC and/or TxRx for the RBS to utilize. Accordingly, in step 71 the RBS 14 transmits the control information to the MSC 10 prior to the determination in step 72 of whether an idle channel is available. In this procedure, each TIC would preferably be identified by a network telephone number the same as is a standard telephone line. Thus, in step 77a the MSC 10 directs the RBS 14 to use a certain TIC, TxRX and frequency for the call but does not provide a telephone number to the RBS 14. Instead, as shown by step 81, once the MSC 10 designates an available TxRx (such as TxRx $22_1$) at the RBS 14, the MSC 10 initiates a call to a telephone number or the like which is ordinarily assigned to the selected TIC. It should be understood that while preferably the telephone number of the TIC dialed by the MSC will correspond to the designated transceiver, other systems are conceivable. Next, as shown in step 83, the selected TIC $24_1$ at the RBS 14 detects ringing current when the switching office 18 of the network connects the call and goes "off-hook" to complete the circuit to the RBS 14. Preferably the switching office 18 of the network then signals an answer to the MSC 10 indicating the completed circuit. Once the voice line has been established, steps 84–86 of FIG. 7 are essentially identical to steps 84–86 of FIG. 6, described previously. Thus, the RBS now has a voice line to the MSC, and the MSC is now able to connect the call to its ultimate destination as described previously, for example, by seizing a trunk and signalling the dialed number to the common carrier network. As will be appreciated by those skilled in the art of telephony, other alternative procedures for establishing voice circuits may accomplish a similar result.

For example, once a line is dialed-up and a voice circuit established between the MSC and the RBS, the line can be utilized as a voice circuit for a period of time independent of the initiating mobile call. In other words, the established voice line could remain connected for future mobile calls even after the mobile call that originally utilized the connection was completed. Thus, dial-up lines can be seized outright for a period of time regardless of the number of calls requiring connection. For example, a number of lines might automatically be dialed-up at the beginning of each business day and not released until the peak calling hours are over. Such lines would be equivalent to a permanent connection, but only for a limited period of time without being fully dedicated. Such a method may minimize the amount of tolls that would be charged each time a line was dialed.

Similarly, voice lines may be dialed-up in anticipation of demand rather than on demand. Thus, rather than wait for a mobile call before establishing a voice line, one or more voice lines could be dialed-up in advance. When a voice line is needed, the MSC would assign the call to the pre-established voice line and immediately dial-up (or direct the RBS to dial-up) a new line in preparation for the next call. Such a system would eliminate the delay time that exists from the initiation of a call (detection of a dial tone) to connection (off-hook at the receiving end).

Additionally, it is conceivable that certain RBS-to-MSC connections will utilize a combination of the dedicated lines of the prior art and the dial-up lines of the present invention. For example, while it is possible that the data line could also be a dialed line, the efficiency of such a system would depend on the number of times the data connection had to be made. Thus, it might be more cost-effective to have the data line be dedicated.

Similarly, depending on the individual circumstances of a particular system, it might be more efficient to design a hybrid system having both dedicated and dialed-up connections for voice circuits. For example, in systems having a reasonably consistent minimum amount of activity, dedicated lines might be provided for handling the predicted minimum while dialed-up lines would be utilized for activity exceeding the minimum. In another application, dial-up voice lines might handle the initial call, but should it be necessary to handoff the call to another cell as a caller migrates, dedicated lines may be utilized for the handoff.

In such hybrid systems, it can be readily appreciated that the optimal ratio of dedicated trunk circuits to dialed-up circuits may be different for each RBS and/or MSC, and that the optimal number can be determined in any number of ways. Moreover, it should be understood that all of the foregoing examples along with other examples not mentioned can be combined in numerous and varying ways without departing from the spirit and scope of the invention as defined by the appended claims.

Figure 8:
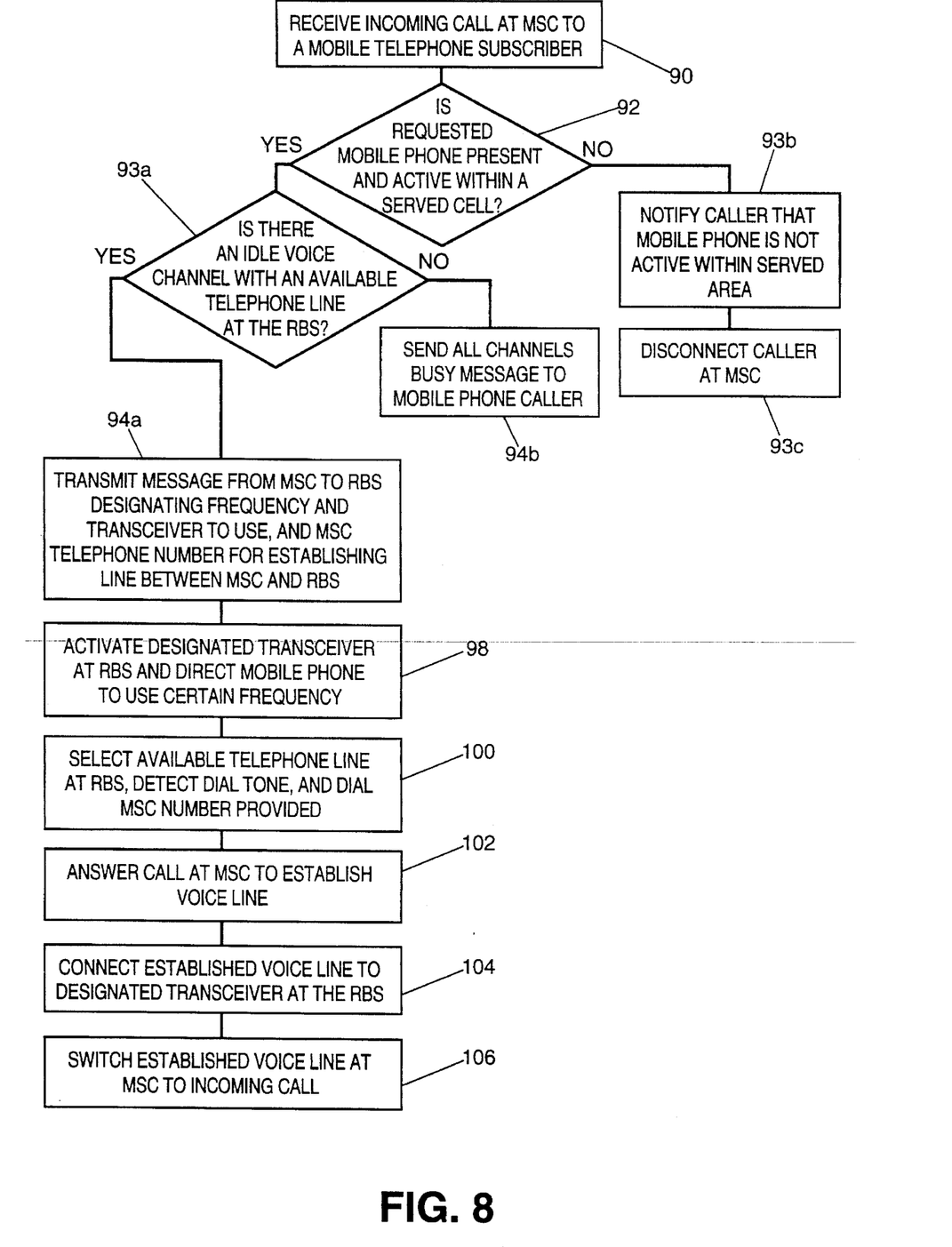
FIG. 8 is a flow diagram of system software functions for implementing the invention when a mobile telephone is dialed from the common carrier network and the RBS calls the MSC to establish a voice circuit.
Figure 9:
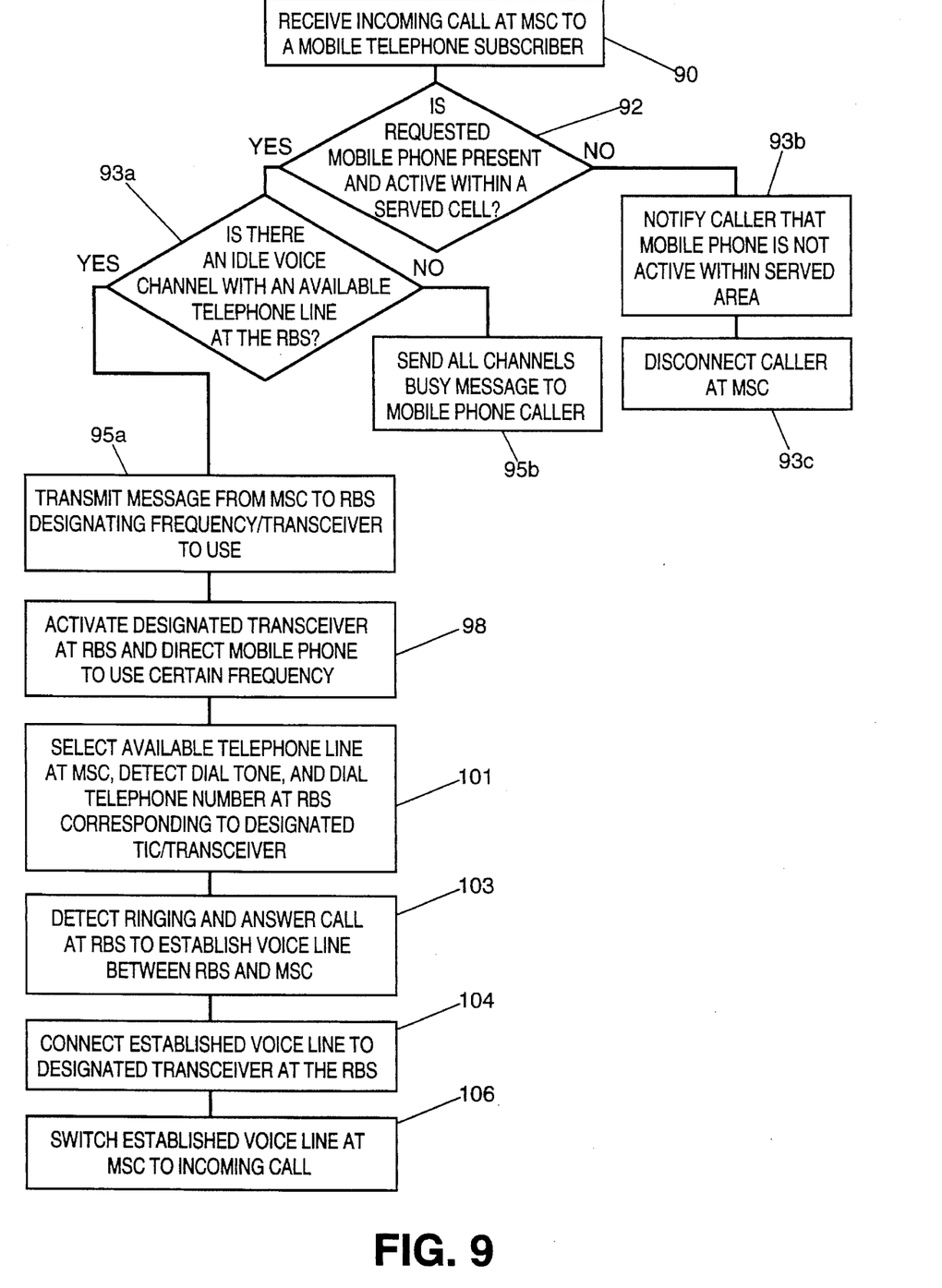
FIG. 9 is a flow diagram of system software functions for implementing the invention when a mobile telephone is dialed from the common carrier network and the MSC calls the RBS to establish the voice circuit.

FIGS. 8 and 9 illustrate a typical process flow when a caller attempts to reach a mobile telephone, either from the common carrier network or alternatively from another mobile phone. In either case, once a call is received, the MSC communicates with its various RBSs in the conventional manner to find the best available signal for communicating with the desired mobile.

Referring to FIGS. 2–4 and the numbered steps of FIG. 8, a typical process flow of a call to a mobile telephone utilizing TxRx $22_1$ of RBS 14 is as follows:

Step 90. The MSC 10 receives an incoming call requesting connection to a mobile telephone (not shown).

Step 92. The MSC 10 communicates with the RBSs in its system to determine if the mobile phone is present and active (turned-on) within one of its RBSs. If the mobile telephone does not properly respond, i.e., the mobile phone is out of the service area or is not activated, the MSC typically signals the caller accordingly, as shown in step 93b. If the caller does not subsequently hang-up after a short period of time, the caller is disconnected to free up the appropriate facilities, as shown in FIG. 93c. Although not necessary to the invention and not shown, ordinarily the MSC 10 first determines (by means not shown) the validity of the mobile phone (i.e., whether the mobile telephone is registered to a system subscriber) before any further steps are taken.

Step 93a. The RBS 14 typically checks for an idle voice channel (transceiver) and telephone line. As shown by step 94b, if no transceiver and line are idle, the RBS 14 sends a busy signal or its equivalent to the mobile caller.

Step 94a. If a voice channel and telephone line are idle, and if the mobile has properly responded (and was properly validated), the MSC 10 transmits a message through data line 12 (typically a dedicated line) to CTL 20 of RBS 14, directing CTL 20 to select one of its TxRxs $22_1$–$22_n$ (for example TxRx $22_1$) for providing service to the mobile telephone on a certain RF frequency and directing the RBS 14 to send a message to the mobile telephone instructing it to use that certain RF frequency for the call. In keeping with the invention, the message to the RBS also contains one of the telephone numbers reserved by the MSC 10 to which the RBS 14 is to place a call in order to establish a voice communications line (for example voice line $16_1$ of FIG. 3) between the RBS 14 and the MSC 10.

Step 98. The RBS 14 activates and appropriately tunes the designated transceiver, TxRx $22_1$, and directs the mobile telephone (not shown) to tune itself to the designated frequency. The mobile telephone tunes its own transceiver to the designated frequency and, if appropriate, connects its audio section to the TxRx $22_1$.

Step 100. The TIC $24_1$ of FIG. 3 associated with the selected TxRx $22_1$ at the RBS 14 seizes its associated line (such as voice line $16_1$) to the switching office 18 of the common carrier network, detects dial tone, and dials the appropriated MSC telephone number.

Step 102. The MSC answers the call, establishing the voice line $16_1$, through switching office 18 and over trunk circuit 30.

Step 104. Utilizing the TIC $24_1$, the RBS 14 then connects its end of the voice line $16_1$ to the TxRx $22_1$. The mobile telephone now has a two-way voice path to the RBS 14 and over the dialed voice line $16_1$ to the MSC 10.

Step 106. The MSC 10 then switches the dialed voice line $16_1$ to the trunk line originally dialed by the network caller (or other voice line if the incoming call is from a mobile phone), and thus the mobile phone is now connected to the network (or other mobile phone).

In an alternative procedure to that of steps 94a through steps 102, as shown in FIG. 9 the MSC 10 initiates the call that connects the MSC 10 to the RBS 14. In this procedure, each TIC would preferably be identified by a network telephone number the same as is a standard telephone line. In step 95a the MSC 10 directs the RBS 14 to use a certain TIC, TxRX and frequency for the call but does not provide a telephone number to the RBS 14. Instead, as shown by step 101, once the MSC 10 designates an available TxRx (such as TxRx $22_1$) at the RBS 14, the MSC 10 initiates a call to a telephone number or the like which is ordinarily assigned to the selected TIC. It should be understood that while preferably the telephone number dialed by the MSC will correspond to the designated transceiver, other systems are conceivable. Next, as shown in step 103, the selected TIC $24_1$ at the RBS 14 detects ringing current when the switching office 18 of the network connects the call and goes off-hook to complete the circuit to the RBS 14. Preferably the switching office 18 of the network then signals an answer to the MSC 10 indicating the completed circuit. Once the voice line has been established, steps 104–106 of FIG. 9 are essentially identical to steps 104–106 of FIG. 8, described previously. Thus, the RBS now has a voice line to the MSC, and the MSC is now able to connect the call from the network (or other mobile phone) to the mobile phone as described previously, i.e., generally by connecting the incoming trunk (other voice line) to the dialed-up voice line. As will be appreciated by those skilled in the art of telephony, other alternative procedures for establishing voice circuits may accomplish a similar result.

Figure 5:
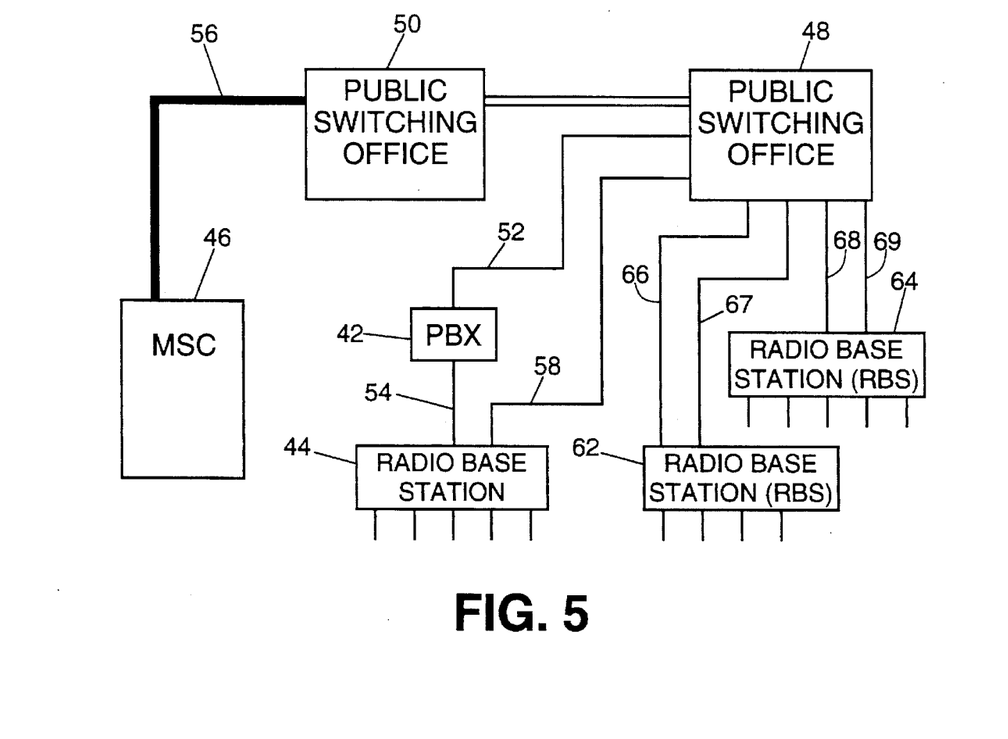
FIG. 5 illustrates an alternative embodiment of the invention, which includes a private branch exchange (PBX) in the network.

Finally, FIG. 5 shows an alternative embodiment utilizing a private branch exchange (PBX) 42 for connecting an RBS 44 to an MSC 46 through public switching offices 48 and 50. Direct Inward Dial (DID) trunks 52 connect the PBX 42 to the public switching office 48 and allow direct dialing to or from the RBS 44 as if the PBX lines 54 (extensions) were connected directly to the switching office 48. Such an embodiment is particularly useful in microcell applications since the PBX lines 54 wired in a building can be employed to achieve the connection from the RBS 44 (e.g., microcell) to the public switching offices 48 and 50 and ultimately to the MSC 46 through trunks 56. A data line 58 also ultimately connects the RBS 44 to the MSC 46 via the public switching offices 48 and 50. Although as shown here the data line 58 does not connect through the PBX 42, it can be readily appreciated that the data line could connect through PBX 42 or even directly to the MSC 46. To emphasize the flexibility of such systems, additional RBSs 62 and 64 are shown as connecting (through data lines 66 and 68 and voice lines 67 and 69 respectively) to the MSC 46 via the public switching offices 48, 50 without requiring PBX facilities.

As can be seen from the foregoing detailed description, a more efficient system is provided for establishing voice lines for mobile telephone communications by reducing the number of dedicated lines connecting a mobile switching center to its radio base stations. Instead of permanent and dedicated lines, voice lines are established through a dial-up procedure initiated either at mobile switching centers, or radio base stations which might include PBX facilities.

What is claimed is:

1. A cellular mobile telephone system incorporating a switching office of a common carrier telephone system, the cellular mobile telephone system comprising:

a mobile switching center for connecting mobile telephones in the system to one another and to telephones outside the system by way of the switching office according to telephone addresses provided by originating callers;

a cellular radio base station defining a cell of the system for connecting the mobile telephones to the mobile switching center;

a plurality of trunk lines connecting the mobile switching center and the switching office;

means for connecting the cellular radio base station to the switching office in accordance with a protocol of the common carrier system;

means for connecting and disconnecting in a predetermined manner the cellular radio base station and the mobile switching center by way of the switching office thereby establishing a completed data link therebetween; and means for communicating control information between the cellular radio base station and the mobile switching center on the completed data link.

2. The cellular mobile switching system of claim 1 wherein the means for connecting and disconnecting the base station and the mobile switching center by way of the switching office further enables a temporary voice circuit for at least one mobile telephone call, the temporary voice circuit being established independent of the telephone addresses provided by the originating callers.

3. The cellular mobile switching system of claim 2 wherein the data link and the temporary voice circuit comprise separate electrical circuits.

4. The cellular mobile switching system of claim 1 wherein the data link is connected between the cellular radio base station and the mobile switching center in response to the initiation of a call to or from a mobile telephone.

5. The cellular mobile switching system of claim 1 wherein the data link is disconnected between the cellular radio base station and the mobile switching center in response to communication between the cellular radio base station and a mobile telephone.

6. The cellular mobile switching system of claim 1 wherein the data link is disconnected between the cellular radio base station and the mobile switching center in response to the termination of a call to or from a mobile telephone.

7. The cellular mobile switching system of claim 1 wherein the data link between the cellular radio base station and the mobile switching center is connected and disconnected at predetermined connection and disconnection times.

8. The cellular mobile switching system of claim 1 wherein the cell defined by the base station is a microcell within at least one larger cell of the system.

9. The cellular mobile switching system of claim 1 wherein the means for connecting and disconnecting the cellular radio base station and the mobile switching center includes a control unit at the radio base station for controlling the operation of the means for connecting the cellular radio base station to the switching office.

10. The cellular mobile switching system of claim 9 wherein the means for connecting the cellular radio base station to the switching office includes a telephone interface circuit, wherein the telephone interface circuit detects a signal indicating the switching office is prepared to receive a call and signals a telephone line address assigned to the mobile switching center as directed by the control unit, thereby establishing the completed data link from the cellular radio base station to the mobile switching center through the switching office.

11. The cellular mobile switching system of claim 9 wherein the means for connecting the cellular radio base station to the switching office is a telephone interface circuit having a telephone line address, the telephone interface circuit having the capability of detecting a signal indicating the presence of an incoming call from the switching office, the telephone interface circuit connecting the cellular radio base station to the mobile switching center upon detection of the signal indicating the presence of an incoming call from the switching office and under the control of the control unit.

12. A mobile switching center for switching calls among mobile telephone subscribers and to landline telephone subscribers according to a telephone address provided by an originating caller, via at least one associated cellular radio base station of a cellular system, the cellular radio base station having at least one transceiver, said mobile switching center including:

means for establishing a standard telephone circuit connection between the mobile switching center and the cellular radio base station, the circuit being established by standard landline telephone signalling;

means for communicating control information over the established standard telephone circuit connection; and means for determining when the standard telephone connection needs to be established and when it can be released.

13. The mobile switching center of claim 12 wherein the mobile switching center has a unique telephone address which is independent of the telephone address provided by the originating caller, and the means for establishing a standard telephone circuit connection includes means at the mobile switching center for receiving a telephone call corresponding to said unique telephone address from the cellular radio base station.

14. The mobile switching center of claim 12 wherein the cellular radio base station has a unique telephone address which is independent of the telephone address provided by the originating caller, and the means for establishing a standard telephone circuit connection includes means at the mobile switching center for originating a telephone call to the cellular radio base station by standard landline telephone signalling corresponding to said unique telephone address.

15. A cellular radio base station containing a plurality of radio transceivers for converting radio frequency communications from mobile subscribers to electrical signals, said cellular radio base station being associated with a mobile switching center, said cellular radio base station including:

a control unit;

means for selectively connecting the control unit to the mobile switching center by standard landline telephone signalling, whereby a communication path is established between the cellular radio base station and the mobile switching center; and means for communicating control information from the control unit to the mobile switching center over the established communication path.

16. The cellular radio base station of claim 15 wherein the mobile switching center has a unique telephone address, and the means for connecting the control unit to the mobile switching center includes means of originating a telephone call from the cellular radio base station to the mobile switching center using standard landline telephone signalling corresponding to said unique telephone address.

17. The cellular radio base station of claim 15 wherein the cellular radio base station has a unique telephone address, and the means for connecting the control unit to the mobile switching center includes means of detecting an incoming call to the unique telephone address from the mobile switching center.

18. In a cellular mobile telephone system incorporating a switching office of a common carrier telephone system, a method of communicating information between a cellular radio base station and a mobile switching center, comprising the steps of:

detecting a signal indicating that the switching office is prepared to receive a call;

selectively establishing a data link between the mobile switching center and the cellular radio base station by dialing up a telephone connection through the switching office using standard landline telephone signalling; and communicating control information over the established data link.

19. The method of claim 18 wherein the step of establishing the data link comprises dialing up a telephone connection from the cellular radio base station to the mobile switching center.

20. The method of claim 18 wherein the step of establishing the data link comprises dialing up a telephone connection from the mobile switching center to the cellular radio base station.

21. The method of claim 20 wherein the telephone connection is established by dialing a telephone line address associated with a control unit at the cellular radio base station.

22. The method of claim 20 further comprising the steps of:

establishing at least one voice path between the mobile switching center and the cellular radio base station by dialing up at least one other telephone connection through the switching office;

receiving and decoding at the cellular radio base station a radio frequency signal comprising an origination request and dialed telephone number from a mobile telephone;

transmitting a control message from the cellular radio base station to the mobile switching center over the established data line, the message including data identifying the mobile telephone that is requesting service and the dialed telephone number;

transmitting a return message from the mobile switching center to the cellular radio base station, the message containing information for:

1) directing the cellular radio base station to select a designated transceiver and frequency for providing service to the mobile telephone, and 2) directing the cellular radio base station to send a message to the mobile telephone instructing it to use the designated radio frequency for the call; and utilizing the voice line for connecting voice signals received from the mobile unit at the cellular radio base station to the mobile switching center.

23. The method of claim 18 further comprising the steps of:

establishing at least one voice path between the mobile switching center and the cellular radio base station by dialing up at least one other telephone connection through the switching office;

receiving an incoming call at the mobile switching center requesting to connect the caller with a cellular mobile telephone;

determining whether the requested cellular mobile telephone is active within the system, and a) if not active, notifying the caller that the mobile phone is not active within the system and disconnecting the caller at the mobile switching center, or b) if active:
1) transmitting a message from the mobile switching center to the cellular radio base station over the established data link, the message containing information for directing the cellular radio base station to select a designated transceiver and frequency for providing service to the mobile telephone,
2) directing the cellular radio base station to send a message to the mobile telephone instructing it to use the designated radio frequency for the call;
3) connecting the established voice line to the designated transceiver at the cellular radio base station; and
4) switching the incoming call at the mobile switching center to the established voice line, thereby providing a path from the incoming call to the mobile telephone.

24. The method of claim 18 further comprising the steps of:
receiving an incoming call at the mobile switching center requesting to connect the caller with a cellular mobile telephone;
determining whether the requested cellular mobile telephone is active within the system, and
a) if not active, notifying the caller that the mobile phone is not active within the system and disconnecting the caller at the mobile switching center, or
b) if active:
1) establishing at least one voice path between the mobile switching center and the cellular radio base station by dialing up at least one other telephone connection through the switching office;
2) transmitting a message from the mobile switching center to the cellular radio base station over the established data link, the message containing information for directing the cellular radio base station to select a designated transceiver and frequency for providing service to the mobile telephone,
3) directing the cellular radio base station to send a message to the mobile telephone instructing it to use the designated radio frequency for the call;
4) connecting the established voice line to the designated transceiver at the cellular radio base station; and
5) switching the incoming call at the mobile switching center to the established voice line, thereby providing a path from the incoming call to the mobile telephone.

25. The method of claim 24 wherein the step of transmitting a message from the mobile switching center to the cellular radio base station over the established data link includes the step of transmitting a telephone address of the mobile switching center to the radio base station, and wherein the step of establishing a voice line between the mobile switching center and the cellular radio base station includes the steps of receiving the telephone address at the radio base station and dialing the telephone address of the mobile switching center at the radio base station.

* * * * *